US012030688B1

(12) United States Patent
Hoffman

(10) Patent No.: US 12,030,688 B1
(45) Date of Patent: Jul. 9, 2024

(54) SYSTEMS AND METHODS FOR PHARMACEUTICAL CONTAINER PROCESSING

(71) Applicant: Express Scripts Strategic Development, Inc., St. Louis, MO (US)

(72) Inventor: Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 278 days.

(21) Appl. No.: 17/004,361

(22) Filed: Aug. 27, 2020

(51) Int. Cl.
*B65B 69/00* (2006.01)
*B65B 21/18* (2006.01)
*B65B 59/00* (2006.01)
*B67B 7/00* (2006.01)

(52) U.S. Cl.
CPC .......... *B65B 69/0033* (2013.01); *B65B 21/18* (2013.01); *B67B 7/38* (2013.01)

(58) Field of Classification Search
CPC ..... B65B 69/0033; B65B 5/105; B65B 21/18; B65B 21/22; B67B 7/38; B65G 41/001; B65G 41/002; B65G 47/22; B65G 47/24; B65G 47/244; B65G 47/248
USPC ................................ 414/403, 404, 412, 413
See application file for complete search history.

(56) References Cited

U.S. PATENT DOCUMENTS 3,263,843 A * 8/1966 Per .......................... F28F 3/08 414/412
3,933,067 A * 1/1976 Clark .................... B26D 3/006 83/578
4,216,855 A * 8/1980 Raudat .................... B65B 21/04 198/836.3
4,610,596 A * 9/1986 Bouldin .............. B65B 69/0033 414/412
4,732,057 A * 3/1988 Tamura ................... B67B 7/164 198/463.4
4,843,801 A * 7/1989 Roncero ............ B65B 69/0033 53/381.2
4,909,414 A * 3/1990 Heath ................ B65B 69/0033 414/412
4,944,647 A * 7/1990 Oleson ...................... B67B 7/38 414/412
5,001,951 A * 3/1991 Eisenlohr ............ B65B 69/0033 83/155.1
5,201,788 A * 4/1993 Le Naour .............. B29C 49/74 53/381.2
5,377,864 A * 1/1995 Blechl ....................... G07F 7/10 221/256
5,725,349 A * 3/1998 Garvey ............... B65B 69/0033 414/412

(Continued)

*Primary Examiner* — Gloria R Weeks
*Assistant Examiner* — Mobeen Ahmed
(74) *Attorney, Agent, or Firm* — Stinson LLP

(57) ABSTRACT

A pharmaceutical container processing system for removing pharmaceuticals from a batch of containers includes a cutter to cut open the batch of containers. A holder has a plurality of container receivers defining container receiving spaces sized and shaped to hold the batch of containers. One or both of the holder or the cutter are movable between a loading position and a cutting position. In the loading position, the plurality of container receiving spaces are accessible to receive the batch of containers. In the cutting position, the cutter is in registration with the batch of containers held by holder to cut the batch of containers.

27 Claims, 14 Drawing Sheets

(56) References Cited

U.S. PATENT DOCUMENTS

| | | | | | |
|---|---|---|---|---|---|
| 5,971,041 | A * | 10/1999 | Drewitz | B67C 3/04 141/180 |
| 6,202,278 | B1 * | 3/2001 | Nakayama | G01N 35/026 29/426.3 |
| 6,715,266 | B2 * | 4/2004 | Browning | B65B 69/0058 53/381.2 |
| 7,530,211 | B2 * | 5/2009 | McErlean | B65B 5/103 53/74 |
| 7,765,776 | B1 * | 8/2010 | Leu | B67B 3/00 53/411 |
| 8,117,809 | B2 * | 2/2012 | McErlean | B65B 5/103 53/74 |
| 8,733,586 | B2 * | 5/2014 | Uno | B65B 35/06 221/241 |
| 8,874,260 | B2 * | 10/2014 | Saltsov | A61J 7/0076 700/240 |
| 8,931,383 | B1 * | 1/2015 | Hurwicz | B26D 7/0006 83/56 |
| 10,036,248 | B2 | 7/2018 | Defibaugh | |
| 10,065,788 | B2 * | 9/2018 | Fagen | A61J 7/0454 |
| 10,328,594 | B2 | 6/2019 | Knoble | |
| 10,343,806 | B2 * | 7/2019 | Fagen | A61J 1/035 |
| 10,388,997 | B2 | 8/2019 | Ng | |
| 10,471,621 | B2 | 11/2019 | Fürst | |
| 10,494,126 | B2 * | 12/2019 | Joplin | G07F 17/0092 |
| 10,695,902 | B2 * | 6/2020 | Hoffman | G05B 15/02 |
| 10,709,280 | B2 | 7/2020 | Cheung | |
| 10,865,006 | B2 * | 12/2020 | Hoffman | G16H 20/17 |
| 11,299,346 | B1 * | 4/2022 | Hoffman | B65B 61/20 |
| 11,345,554 | B2 * | 5/2022 | Shea | A61F 13/55105 |
| 2004/0123567 | A1 * | 7/2004 | McErlean | B65C 9/22 53/445 |
| 2004/0139834 | A1 * | 7/2004 | Weiler | B26F 3/12 83/171 |
| 2006/0042408 | A1 * | 3/2006 | Otsuka | B65B 69/0033 83/919 |
| 2006/0242930 | A1 * | 11/2006 | Chambers | B65B 69/0033 53/381.2 |
| 2007/0095018 | A1 * | 5/2007 | Perazzo | B67B 3/2046 53/317 |
| 2008/0056865 | A1 * | 3/2008 | Laing | B65B 69/0033 414/412 |
| 2010/0258404 | A1 * | 10/2010 | Warecki | B65G 47/841 198/339.1 |
| 2012/0000167 | A1 * | 1/2012 | Chojnacki | B65B 69/0033 53/381.1 |
| 2013/0105277 | A1 * | 5/2013 | Uno | B65B 57/20 198/418.3 |
| 2014/0026523 | A1 * | 1/2014 | Wilson | B65B 13/183 248/316.1 |
| 2017/0197748 | A1 * | 7/2017 | Fagen | A61J 1/035 |
| 2017/0197775 | A1 * | 7/2017 | Fagen | A61J 1/035 |
| 2019/0120686 | A1 * | 4/2019 | Oriols Gaja | G01G 19/18 |
| 2019/0174681 | A1 | 6/2019 | Notaguchi | |
| 2019/0183465 | A1 | 6/2019 | Keller | |
| 2019/0371448 | A1 * | 12/2019 | Hoffman | G16H 20/13 |
| 2020/0010275 | A1 * | 1/2020 | Froehlich | B65G 13/10 |
| 2020/0166443 | A1 * | 5/2020 | McCarty, II | G01N 21/88 |
| 2021/0292032 | A1 * | 9/2021 | Trebbi | B65B 69/0058 |

* cited by examiner

SYSTEMS AND METHODS FOR PHARMACEUTICAL CONTAINER PROCESSING

FIELD

The present disclosure generally relates to pharmacy order processing systems, and more particularly to pharmaceutical container processing systems for removing pharmaceuticals from containers and related methods.

BACKGROUND

Pharmaceutical order processing systems typically involve labor intensive processes to remove pharmaceuticals from manufacturer packaging and transfer the pharmaceuticals to a bulk storage container. Once in the bulk storage container, the pharmaceuticals can be used to fill pharmacy orders.

BRIEF SUMMARY

In one aspect, a pharmaceutical container processing system for removing pharmaceuticals from a batch of containers comprises a cutter configured to cut open the batch of containers. A holder has a plurality of container receivers defining container receiving spaces sized and shaped to hold the batch of containers. At least one of the holder or the cutter are movable between a loading position and a cutting position. In the loading position, the plurality of container receiving spaces are accessible to receive the batch of containers. In the cutting position, the cutter is in registration with the batch of containers held by holder to cut the batch of containers.

In another aspect, a method for removing pharmaceuticals from a batch of containers comprises loading the batch of containers into a pharmaceutical container holder; cutting the batch of containers with the cutter to form a pharmaceutical outlet in each container of the batch; and moving the pharmaceuticals out of the batch of containers through the pharmaceutical outlets.

In another aspect, a cutter for cutting comprises a track, a carriage movable along the track, a blade and a prime mover. The blade is coupled to the carriage. The blade has opposite first and second cutting edges. The prime mover is operatively coupled to the carriage to move the carriage and blade along the track in a first direction to cut with the first cutting edge and to move the carriage and blade along the track in a second direction generally opposite the first direction to cut with the second cutting edge.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
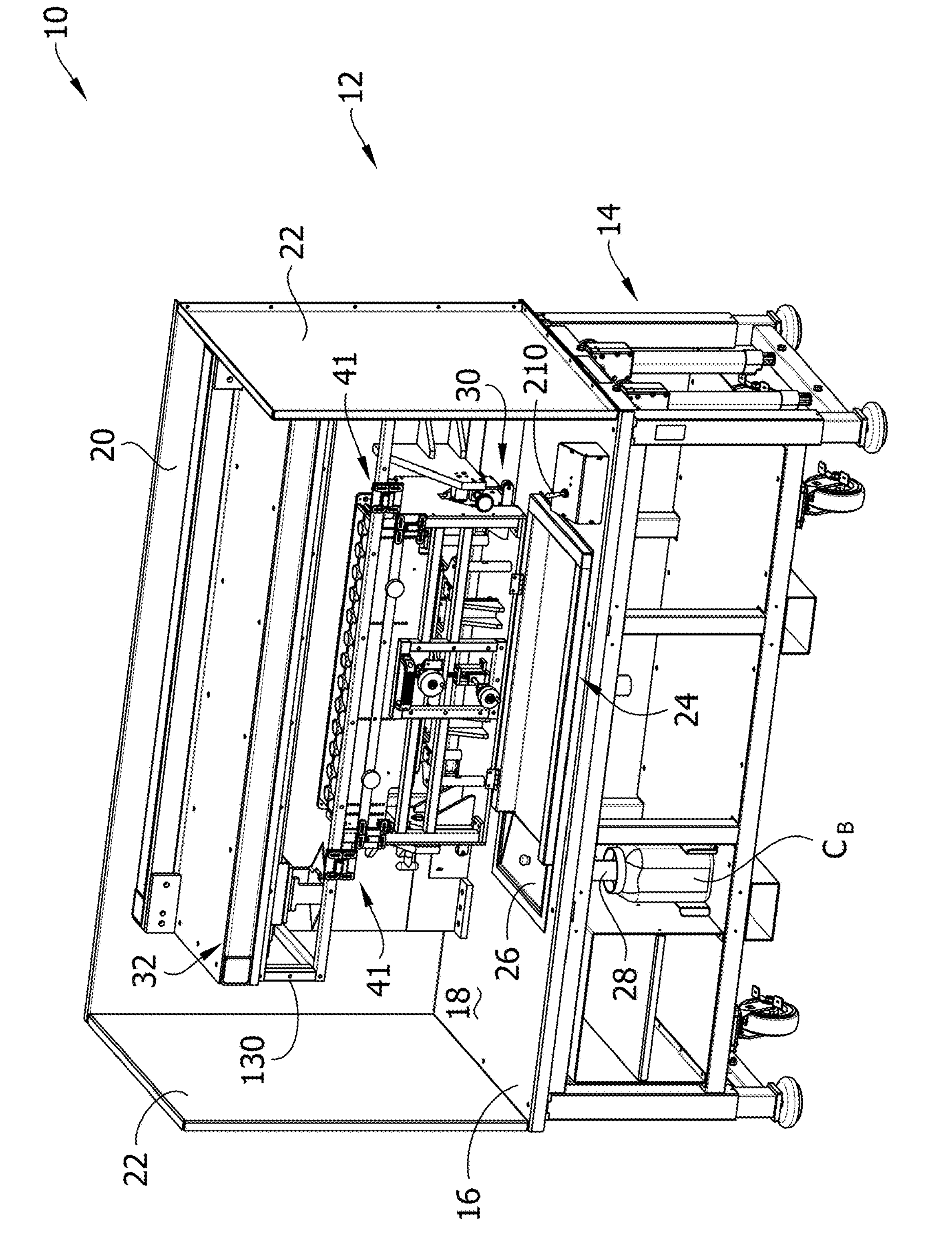
FIG. 1 is a perspective of a pharmaceutical container processing system embodying aspects of the present disclosure.

Referring to the drawings, FIG. 1 illustrates a pharmaceutical container processing system embodying aspects of the present disclosure, indicated generally by reference numeral 10. The pharmaceutical container processing system (e.g., a container disassembly workstation) 10 is used in a pharmaceutical order processing system, such as a high volume pharmaceutical order processing system, to facilitate the fulfillment of a prescription order received by the pharmaceutical order processing system. The prescription order may include one or more pharmaceuticals (e.g., prescription drugs). Pharmaceutical order processing systems typically involve processes to remove pharmaceuticals from the manufacturer's packaging, transfer the pharmaceuticals to bulk storage containers, retrieve the pharmaceuticals from the bulk storage containers and fill and package the various pharmacy orders. The pharmaceutical container processing system 10 disclosed herein is used in a pharmaceutical order processing system to remove the pharmaceuticals from the manufacturer's packaging and transfer the pharmaceuticals to bulk storage containers. After the pharmaceuticals are transferred to the bulk storage containers, the bulk storage containers are transported to other components of the pharmaceutical order processing system where the pharmaceuticals can be used to fill pharmacy orders. Further details on pharmaceutical order processing systems and components thereof may be found in U.S. patent application Ser. No. 15/996,909 and U.S. patent application Ser. No. 16/226,944, the entireties of which are hereby incorporated by reference. However, it will be appreciated that the systems and components disclosed herein can be used in other contexts without departing from the scope of the present disclosure.

The pharmaceutical container processing system 10 is configured to "bulk-up" pharmaceuticals for filling orders in the pharmaceutical order processing system. Generally speaking, "bulking-up" includes transferring the pharmaceuticals contained by a batch (e.g., plurality) of bottles or containers (which may be the same or different sizes) into a single bulk bottle or container to be used with subsequent components of the pharmaceutical order processing system. Specifically, the pharmaceutical container processing system 10 transfers the pharmaceuticals contained within relatively small volume containers $C_S$ (FIG. 2) into relatively large volume bulk containers $C_B$ (FIG. 1). The bulk container $C_B$ can be ten or more times larger than the small volume container $C_S$. For example, the bulk container $C_B$ can be about a liter or about a gallon in volume. In other words, the pharmaceutical container processing system 10 is used to remove the pharmaceuticals from the small containers $C_S$ in order to move the pharmaceuticals into the bulk container $C_B$.

The pharmaceutical container processing system 10 includes a housing 12 having a cabinet 14 supporting a counter or work surface 16 below a work space 18. The housing 12 includes a rear wall 20 and opposite side walls 22 bounding the work space 18. The cabinet 14 includes a bulk container space for positioning the bulk container $C_B$ to receive the pharmaceuticals form the small containers $C_S$. The system 10 includes a pharmaceutical collector 24 generally disposed on the work surface 16 for loading the pharmaceuticals from the small containers $C_S$ into the bulk container $C_B$ disposed below in the cabinet 14. The pharmaceutical collector 24 receives the pharmaceuticals from the small containers $C_S$. The operator can use to the pharmaceutical collector 24 to move the pharmaceuticals into the bulk container $C_B$. The operator can shift through the pharmaceuticals received by the pharmaceutical collector 24 to remove damaged or broken pharmaceuticals and other contaminants. In the illustrated embodiment, pharmaceutical collector 24 includes a door 26 covering a chute 28 leading to the bulk container $C_B$ disposed in the cabinet 14. The operator can open the door 26 and move or slide the pharmaceuticals into the chute 28 to deposit the pharmaceuticals into the bulk container $C_B$. Further details on the pharmaceutical collector 24 are described in U.S. patent application Ser. No. 16/226,944, incorporated by reference above.

Referring to FIGS. 1-12, the system 10 includes a holder 30 (e.g., a pharmaceutical container holder) and a cutter 32 to facilitate the removal of the pharmaceuticals from the small containers $C_S$. The holder 30 is configured to hold a plurality of the small containers $C_S$ to be cut by the cutter 32. The cutter 32 cuts open the containers $C_S$ held by the holder 30 to permit access to the pharmaceuticals contained therein. The holder 30 includes a plurality of container receivers 34 each sized and shaped to hold individual containers of the batch of containers $C_S$. In the illustrated embodiment, the holder 30 includes 13 container receivers 34 to hold 13 containers $C_S$ at the same time, although more or fewer container receivers are within the scope of the present disclosure. The container receivers 34 define container receiving spaces 34A (FIG. 5), each being sized and shaped to receiver or hold a container $C_S$. Desirably the container receiving spaces 34A are slightly larger than the containers $C_S$ to provide a small amount of clearance to allow the containers to easily move into and out of the container receivers.

Figure 11:
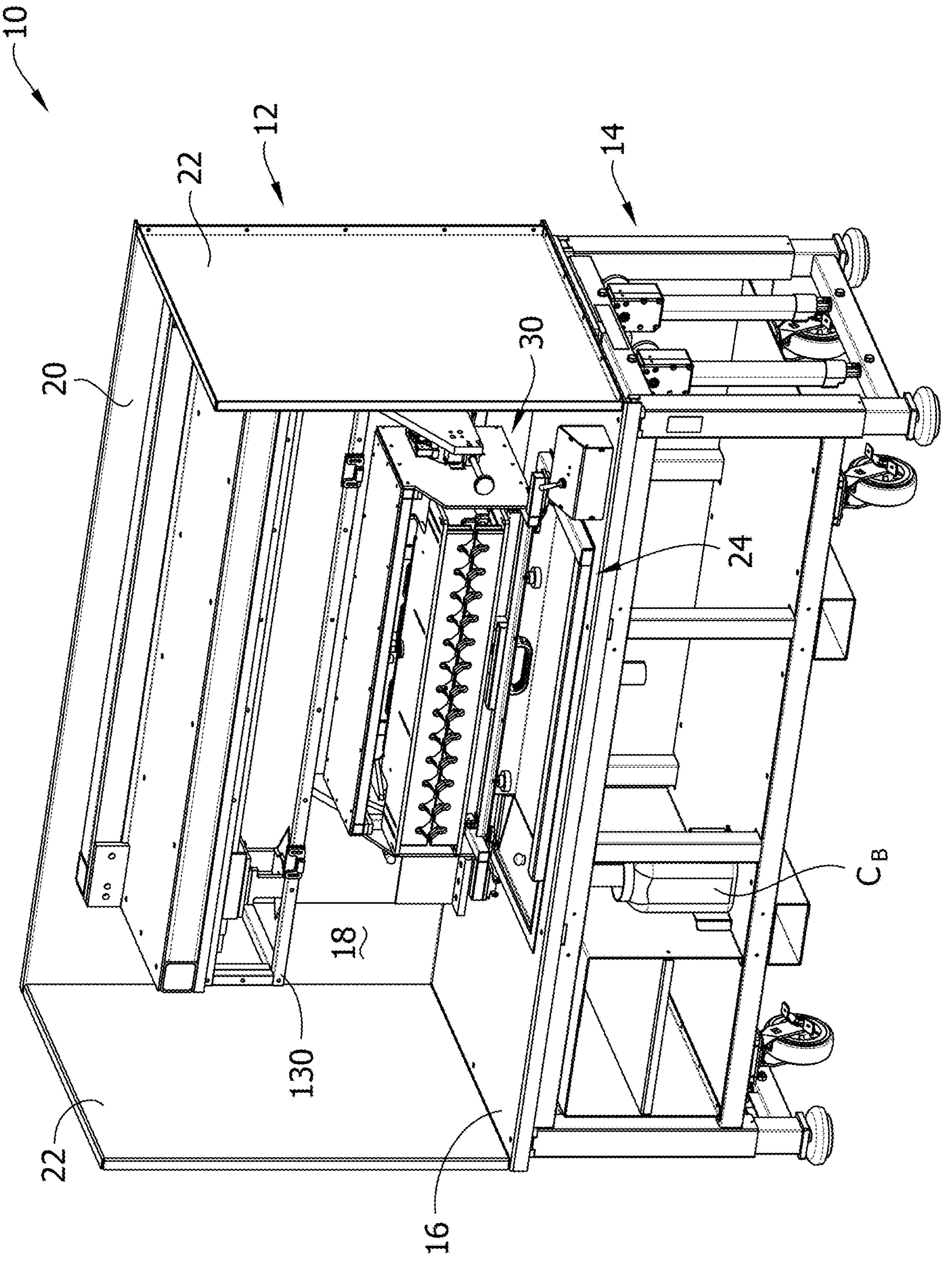
FIG. 11 is a perspective of the pharmaceutical container processing system with the holder in a setup position.

Referring to FIGS. 2-7, the holder 30 includes a holder housing 36 defining an interior 38 of the holder. The holder housing 36 is generally rectangular with a base 36A, a front wall 36B, a rear wall 36C and opposite side walls 36D. The holder housing 36 has an open top. The front and rear walls 36B, 36C are preferably transparent to permit viewing the interior 38 of the holder 30 from outside the housing 36. The front wall 36B includes a door 40 (e.g., access door) pivotably coupled to the base 36A for accessing the interior 38. The door 40 is in a closed position in FIG. 2 and in an open position in FIG. 7. The holder 30 may include latches 41, such as ball and detent latches, to releasably secure the door 40 in the closed position. The holder 30 is disposed (e.g., suspended) in the work space 18. The housing 12 includes first and second holder support brackets 42 for supporting the holder 30. Each side wall 36D of the holder housing 36 is coupled to one of the holder support brackets 42. In the illustrated embodiment, the holder 30 (e.g., side walls 36D) is movably or pivotably coupled to the housing 12 (e.g., holder support brackets 42). This enables the holder 30 to move or rotate between different positions. For example, the holder 30 can be moved to a cutting position (FIGS. 1 and 12), a loading position (FIG. 9), and/or a setup position (FIG. 11). In the loading position, the plurality of container receivers 34 are accessible to receive the containers $C_S$. Specifically, when the holder 30 is in the loading position, the container receivers 34 are arranged to receive the containers $C_S$. In the cutting position, the cutter 32 is in registration (e.g., aligned) with the batch of containers $C_S$ held by holder 30 to cut the containers. Specifically, when the holder 30 is in the cutting position, the container receivers 34 are arranged to position the containers $C_S$ to be cut by the cutter 32. When the holder 30 is in the setup position, the holder is positioned to permit access to one or more components thereof to reconfigure and/or change said component(s) in order to reconfigure the holder to, for instance, hold larger or smaller containers $C_S$.

The holder 30 includes a supporter 44 (FIG. 2) for holding and supporting the batch of containers $C_S$. The supporter 44 includes the plurality of container receivers 34. The supporter 44 is generally disposed in the interior 38 of the holder housing 36 and generally extends through the open top. In the illustrated embodiment, the supporter 44 is supported by (e.g., mounted on) an elevated platform 45 disposed above the base 36A of the holder housing 36. The supporter 44 includes opposite first and second (e.g., front and rear) jaws 46, 48 defining (broadly, at least partially defining) the container receivers 34. In the illustrated embodiment, the first and second jaws 46, 48 generally define opposite sides (e.g., front and rear sides) of the container receivers 34.

Figure 6:
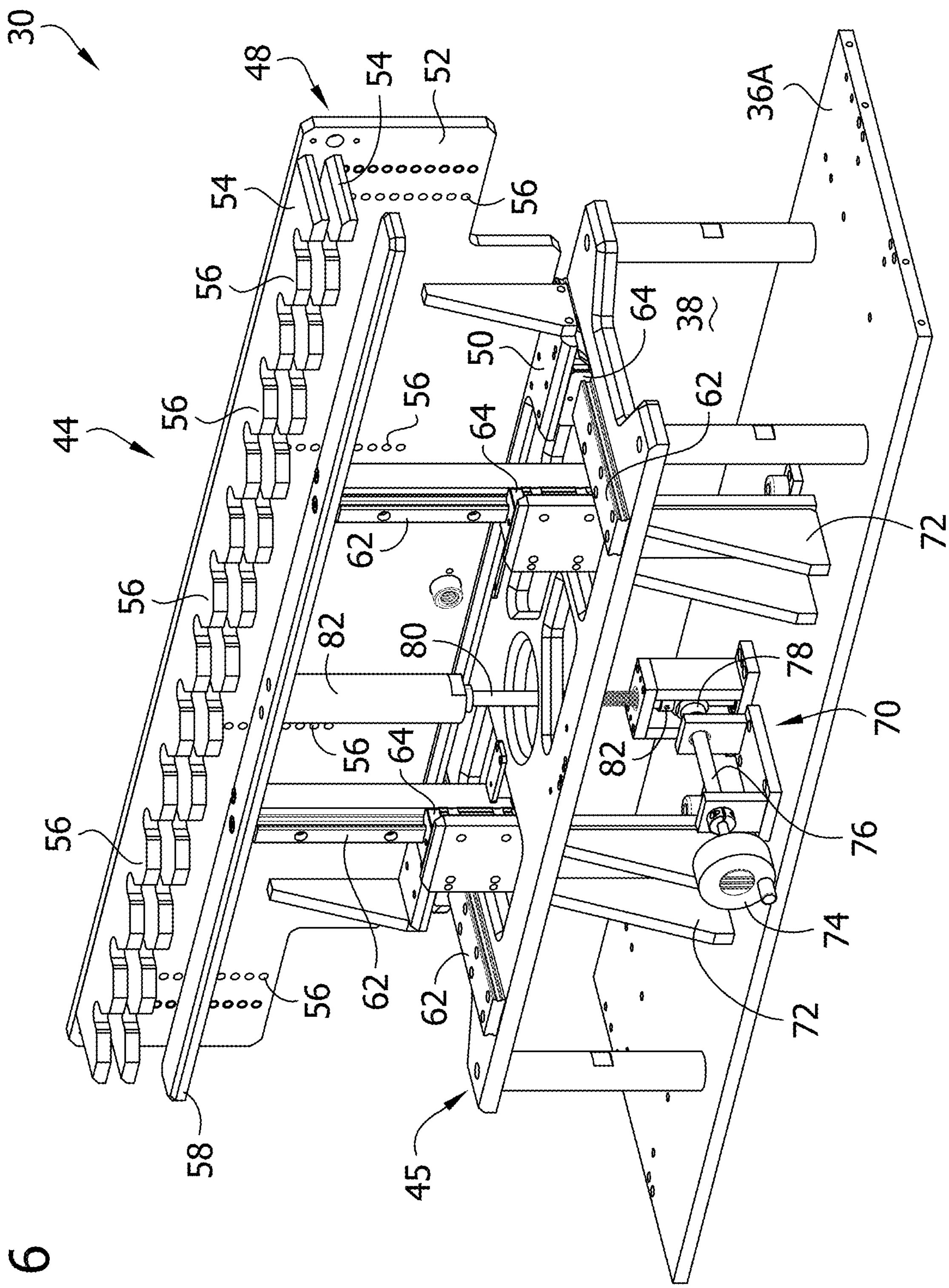
FIG. 6 is similar to FIG. 4 with a first jaw of the holder hidden from view to reveal interior details.
Figure 7:
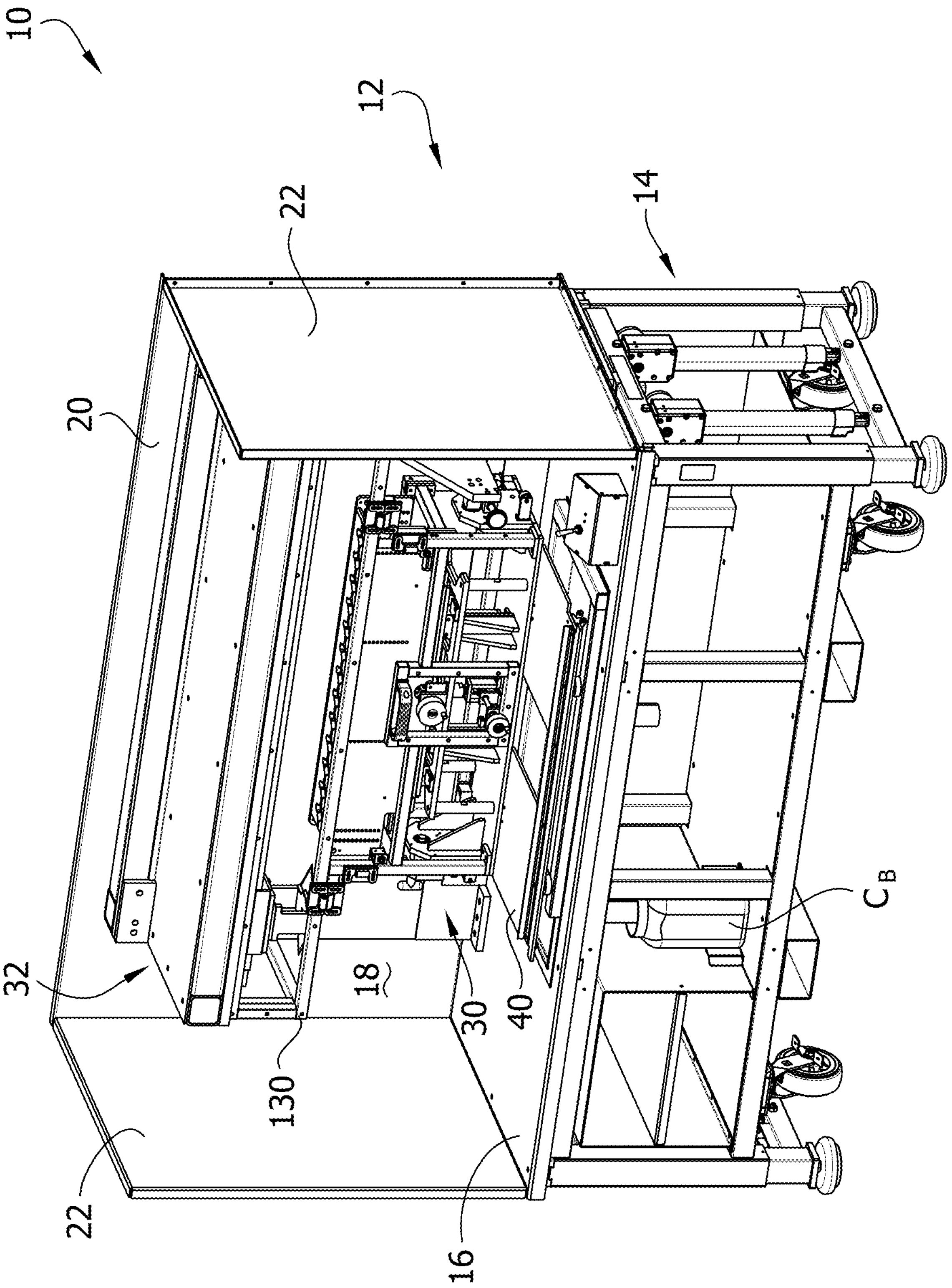
FIG. 7 is a perspective of the pharmaceutical container processing system with an access door of the holder in an open position.

Referring to FIG. 6, the second jaw 48 will be described in further detail with the understanding the first jaw 46 has essentially the same construction (e.g., the first jaw is a mirror image of the second jaw). The second jaw 48 includes a base 50, a mounting flange 52 extending upward from the base and one or more racks 54. The racks 54 generally define one side of the container receivers 34. The racks 54 are mounted on the mounting flange 52. In the illustrated embodiment, the racks 54 each include a plurality of teeth 56 which form parts of adjacent container receivers 34 and act as partitions between container receiving spaces 34A of the receivers. Desirably, the second jaw 48 includes two racks 54, one disposed generally adjacent an upper end of the container $C_S$ and one disposed generally adjacent a lower end of the container so that the upper and lower ends of the container are braced by the second jaw when the container is cut by the cutter 32. The edges of the teeth 56 may be chamfered (as shown in the illustrated embodiment), beveled, or filleted (e.g., rounded) in order to conform the teeth to the shape of the containers $C_S$, which can be generally any shape such as cylindrical, square, rectangle, etc. Each rack 54 is attached to the mounting flange 52 with fasteners (e.g., set screws) (not shown). The fasteners extend through fastener openings 56 in the mounting flange 52 to secure the teeth rack 54 to the mounting flange. In the illustrated embodiment, the mounting flange 52 includes a plurality of fastener openings 56 at different elevations (e.g., heights) on the mounting flange to enable the racks 54 to be attached to the mounting flange at different positions. This allows the racks 54 to be positioned and repositioned on the mounting flange 52 to conform to the size of the containers $C_S$. In addition, the holder 30 may include racks of other shapes and sizes (not shown) for use with containers $C_S$ of other shapes and sizes (e.g., larger containers, medium containers, small containers, etc.). For example, the holder 30 may include a first set of racks 54 for small containers $C_S$ having a diameter of about 1-1½ inches, a second set of racks for medium containers having a diameter of about 2¼-2½ inches, and a third set of racks for large containers having a diameter of about 3-3½ inches. Other sizes are within the scope of the present disclosure. Using the fasteners (e.g., set screws), these other racks can be interchanged with the racks 54 to reconfigure or conform the second jaw 48 for use with the other sizes of containers $C_S$.

The holder 30 also includes a container rest or support 58 defining (broadly, at least partially defining) the container receivers 34. Together, the first and second jaws 46, 48 and the rest 58 define the container receivers 34 and the container receiving spaces 34A. The rest 58 defines the lower end of the container receiving spaces 34A of the receivers 34. The rest 58 is configured to be engaged by the containers $C_S$ and support the containers in the holder 30. The rest 58 is centrally disposed between the first and second jaws 46, 48. The rest 58 is disposed generally below the teeth racks 54 so that the containers $C_S$ support by the rest extend past the teeth racks of the first and second jaws 46, 48.

Figure 5:
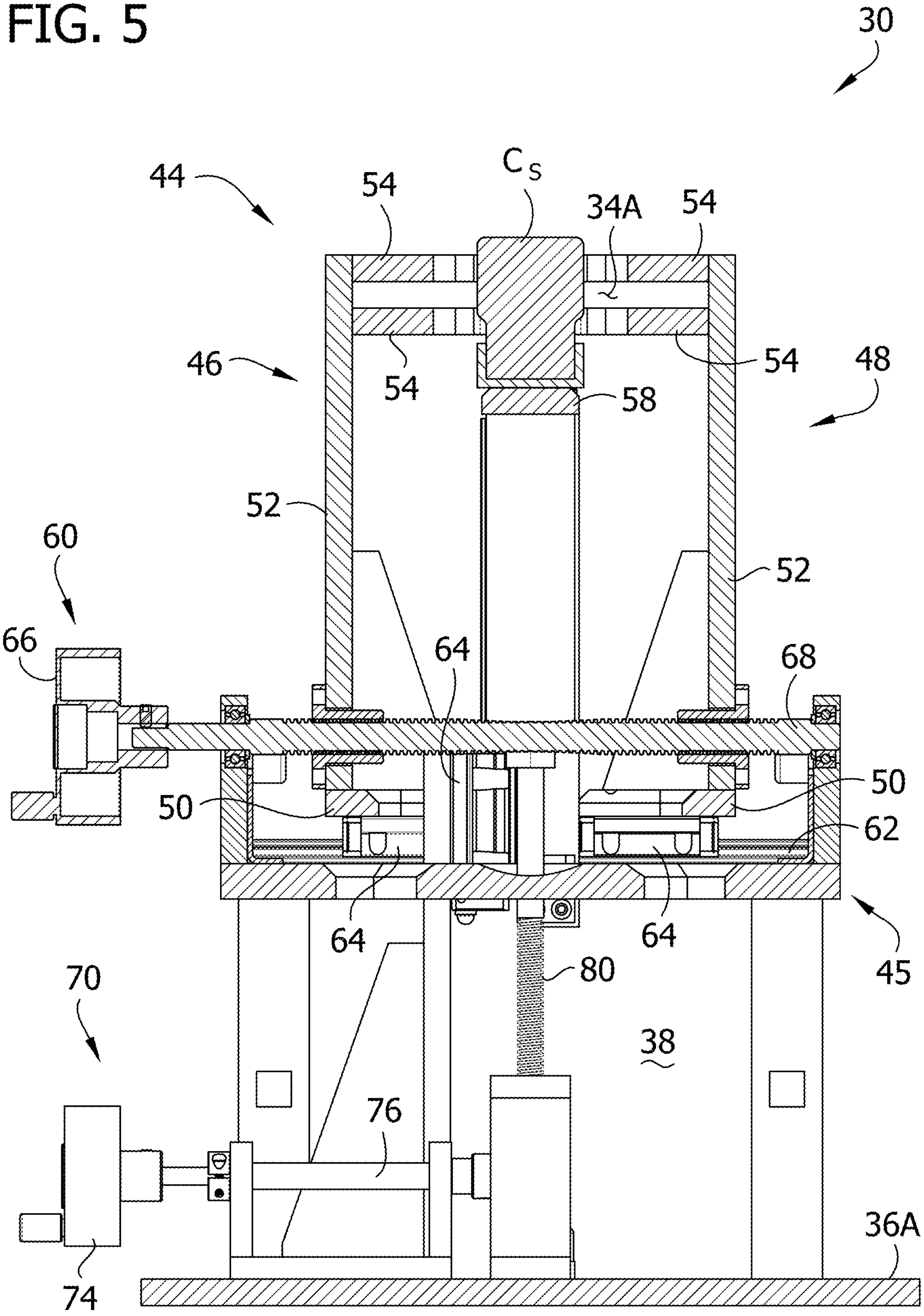
FIG. 5 is a cross-section of the holder taken through line 5-5 of FIG. 4.

Referring to FIGS. 2-5, the holder 30 is selectively adjustable to enable the holder to hold different sizes of containers $C_S$. In particular, the supporter 44 is adjustable to adjust at least one of the size or shape of the plurality of container receiving spaces 34A to conform the plurality of container receivers 34 to different sizes and/or shapes of containers $C_S$. In one manner of adjustment, the first and second jaws 46, 48 are movable to adjust a width of the plurality of container receiving spaces 34A. The holder 30 includes a first adjustor 60 (e.g., a jaw adjustor, a width adjuster) to adjust the width of the container receiving spaces 34A. The first adjuster 60 moves the first and second jaws 46, 48 inward (e.g., toward the rest 58 or toward each other) or outward (e.g., away from the rest or away from each other) to change (e.g., increase or decrease) the distance between the first and second jaws 46, 48 and thereby the width of the container receiving spaces 34A, to configure the holder 30 for different sizes of containers $C_S$. The first and second jaws 46, 48 are movably mounted on the platform 45. Each jaw 46, 48 is movably mounted on rails or tracks 62. In the illustrated embodiment, the holder 30 includes two rails 62 generally parallel to and spaced apart from each other on the platform 45. Each jaw 46, 48 includes two carriages 64 slidably mounted on the two rails 62, respectively. Accordingly, the jaws 46, 48 are slidable along the rails 62. The first adjuster 60 is operatively coupled to the first and second jaws 46, 48 to move the jaws toward or away from each other along the rails 62. The first adjuster 60 includes a handle or knob 66 coupled to and configured to rotate a threaded shaft 68 (FIG. 5). The first and second jaws 46, 48 are threadably connected to the threaded shaft 68. As the handle 66 turns the threaded shaft 68, the threaded shaft rotates and moves the first and second jaws 46, 48 along the rails 62. The threaded shaft 68 includes oppositely oriented first and second threads along different sections of its length. The first threads engage the first jaw 46 and the second threads engage the second jaw 48 so that the jaws move either toward or away from one another as the threaded shaft 68 rotates (either clockwise or counter-clockwise). In an example embodiment, an operator rotates the handle 66 of the first adjustor 60 to adjust the width of the container spaces 34A based on the size, e.g., diameter or maximum horizontal dimension, of the containers $C_S$.

In another manner of adjustment, the rest 58 is movable to adjust a height of the plurality of container receiving spaces 34A. The holder 30 includes a second adjustor 70 (e.g., a rest adjustor, a height adjuster) to adjust the height of the container receiving spaces 34A. The second adjuster 70 moves the rest 58 downward (e.g., toward the platform 45) or upward (e.g., away from the platform) to change (e.g., increase or decrease) the distance between the rest and the upper end of the jaws 46, 48 and thereby the height of the container spaces 34A, to configure the holder 30 for different sizes of containers $C_S$. The rest 58 is movably mounted with rails or tracks 62 and carriages 64. In the illustrated embodiment, two carriages 64 are fixed relative to the base 36A on carriage supports 72 and two rails 62 are slidably mounted to the respective carriages. The rails 62 are coupled to the rest 58. The rails 62 extend generally vertically and are generally parallel to and spaced apart from one another. The second adjuster 70 is operatively coupled to the rest 58 to move the rest upward or downward. The second adjuster 70 includes a handle or knob 74 coupled to and configured to rotate a drive shaft 76 (FIG. 5) with a drive gear 78 at the end thereof. The second adjuster 70 includes a driven shaft 80 with a driven gear 82 coupled thereto and engaged with the drive gear 78 such that rotation of the drive shaft 76 drives rotation of the driven shaft. The rest 58 includes a connector 82 threadably connected to threads on the driven shaft 80 so that the connector moves either upward or downward as the driven shaft rotates (either clockwise or counter-clockwise). Thus, rotating the handle 74 rotates the driven shaft 80 to move the rest 58 upward or downward. In an example embodiment, an operator rotates the handle 74 of the second adjustor 70 to adjust the height of the container spaces 34A based on the size, e.g., height or maximum vertical dimension, of the containers $C_S$.

In another manner of adjustment, different sizes of racks 54 can be interchanged and/or the elevation of the teeth racks can be changed, as discussed above, to configure (e.g., reconfigure) the first and second jaws 46, 48 to fit different sizes and shapes of containers $C_S$. An operator can open the door 40 while the holder 30 is in the cutting position (FIG. 7) to access the fasteners securing the racks 54 of the first jaw 46 to change the positions and/or switch out the teeth racks. An operator can move the holder 30 to the setup position (FIG. 11) to access the fasteners securing the racks 54 of the second jaw 48 to change the positions and/or switch out the racks. Other adjustment mechanisms are within the scope of the present disclosure. For example, the container receivers may be automatically adjustable such as the jaws 46, 48 and rest 58 being automatically moved to adjust the container receivers or the container receivers automatically changing in size and/or shape when a container is pushed into the container receiver.

Figure 2:
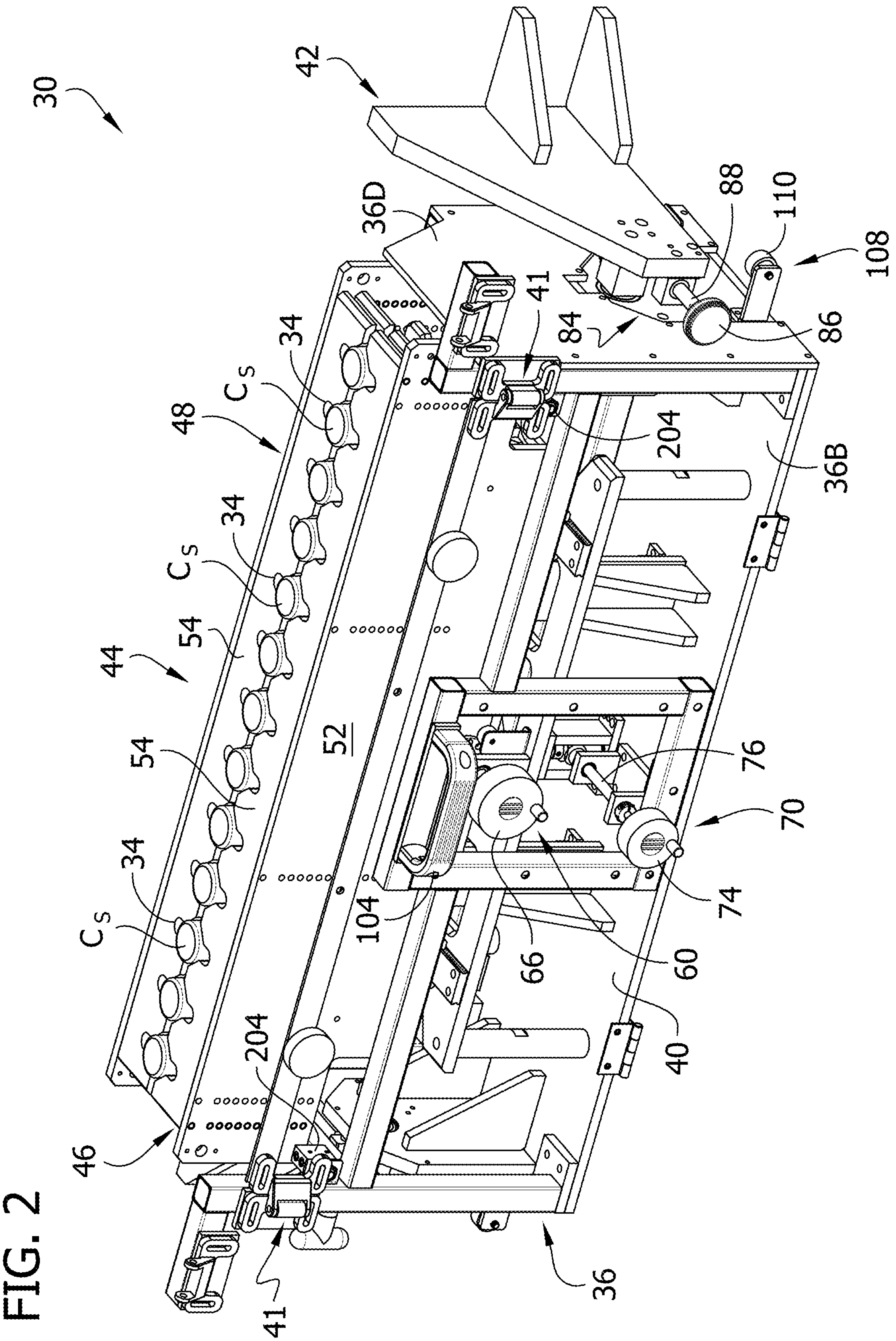
FIG. 2 is a front perspective of a container holder of the pharmaceutical container processing system.
Figure 8:
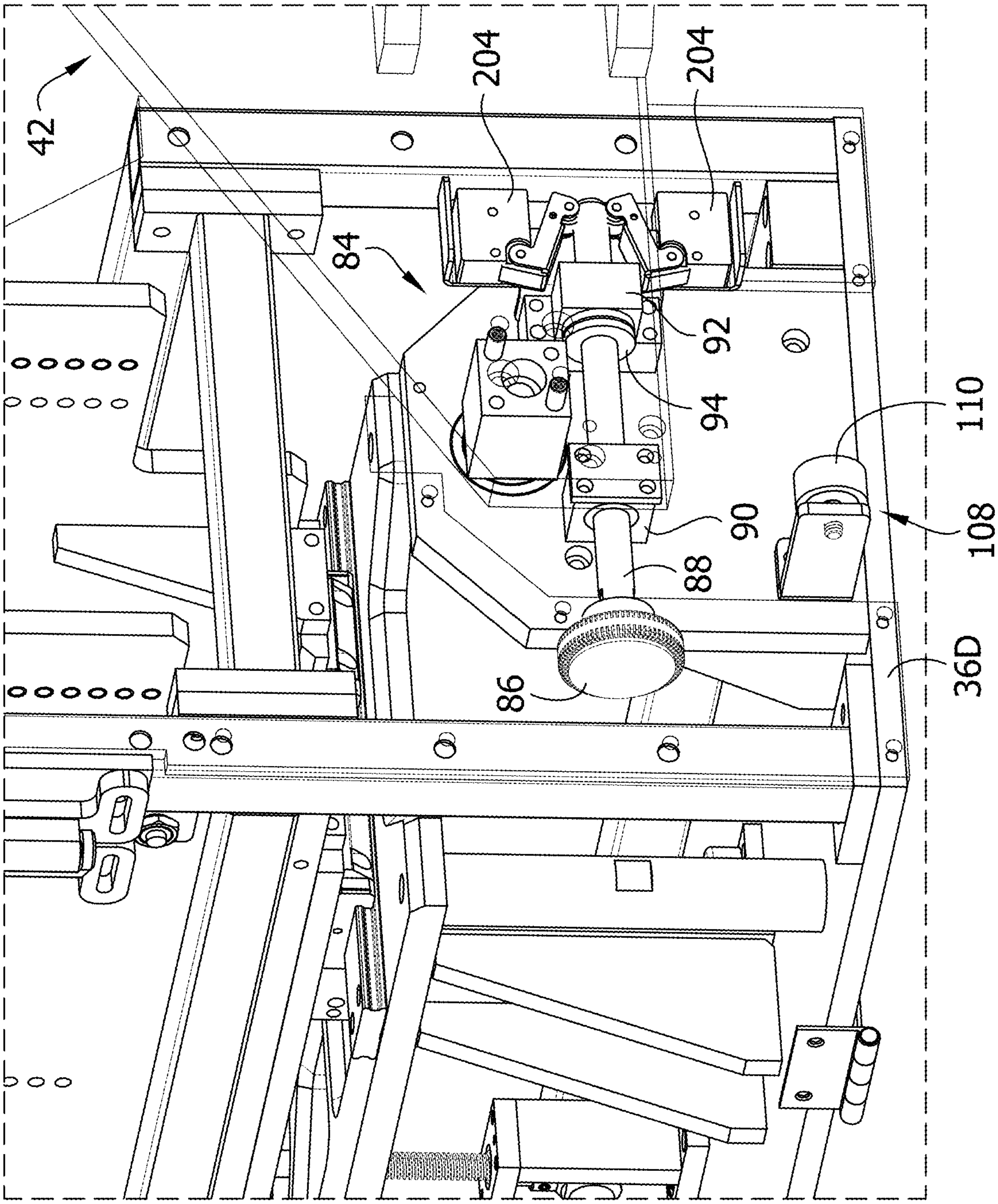
FIG. 8 is an enlarged, fragmentary perspective of the holder showing a first retainer securing the holder in a cutting position, a holder support bracket is shown as being transparent to reveal interior details.
Figure 9:
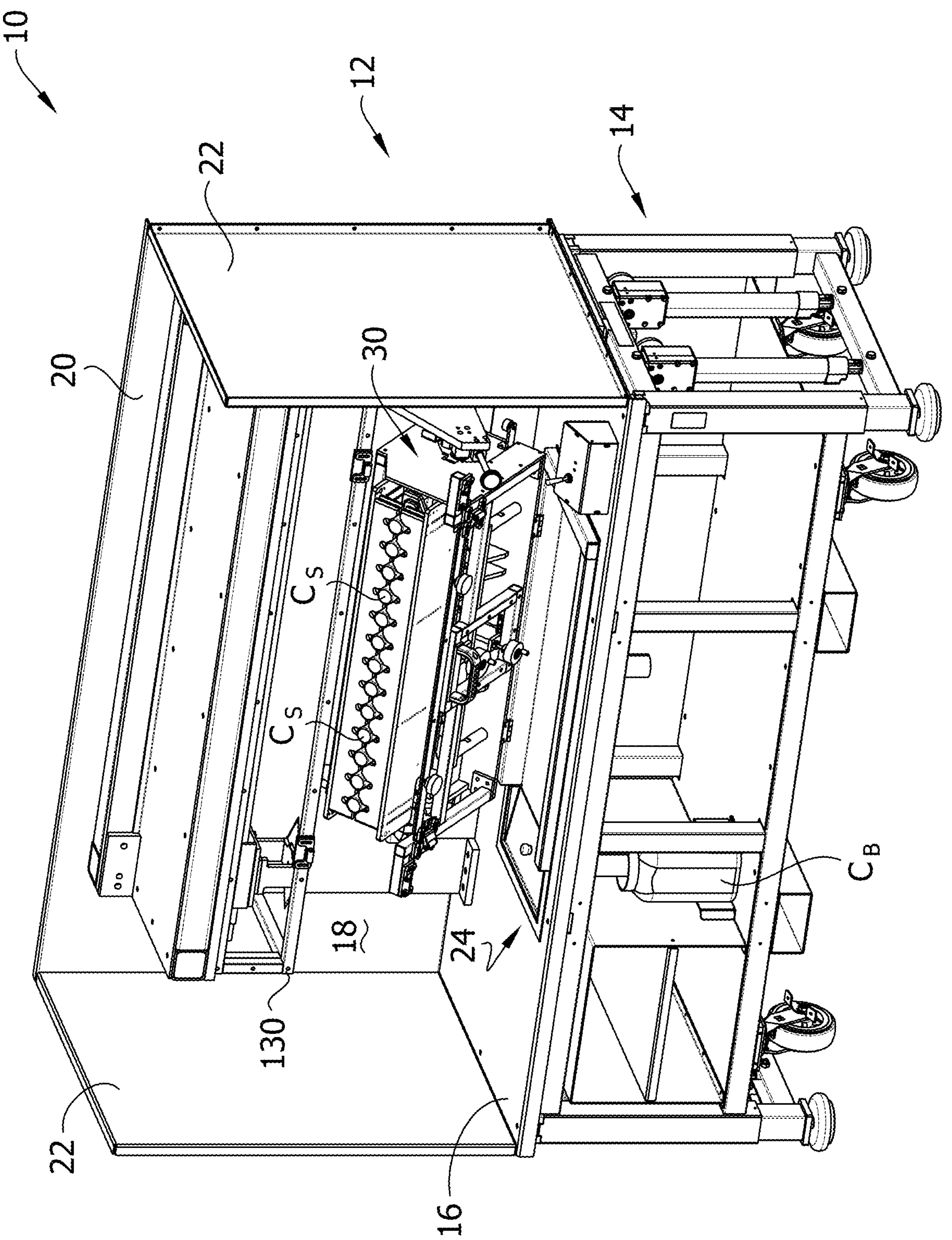
FIG. 9 is a perspective of the pharmaceutical container processing system with the holder in a loading position.

Referring to FIGS. 2, 3, 8 and 10, the system 10 may include one or more retainers (collectively, a retainer assembly) configured to retain the holder 30 in the different positions (e.g., a cutting position, a loading position, a setup position). As shown in FIGS. 2 and 8, a first retainer 84 is provided to retain (specifically, secure) the holder 30 in the cutting position. The first retainer 84 is configured to engage the holder 30 to secure the holder in the cutting position. The first retainer 84 is selectively releasable from the holder 30 (e.g., disengagable) to permit the holder 30 to move from to the cutting position to other positions. The first retainer 84 includes a handle or knob 86 coupled to a shaft 88. The shaft 88 is slidably mounted within a bushing or slide bearing 90 secured to the right holder support bracket 42. When the holder 30 is in the cutting position, the shaft 88 is aligned (e.g., longitudinally aligned) with an opening of the holder. In the illustrated embodiment, the opening of the holder 30 is defined by another bushing or slide bearing 92 secured to the side wall 36D of the holder housing 36. The shaft 88 extends into, and in the illustrated embodiment through, the opening in the slide bearing 92 to engage and lock the holder 30 in the cutting position. Accordingly, to release the holder 30 from the cutting position to move the holder, an operator moves the handle 86 forward to slide the shaft 88 forward and out of the slide bearing 92. With the first retainer 84 out of engagement with the holder 30, the holder is free to be rotated to another position. To secure the holder 30 in the cutting position, the operator moves the handle 86 rearward to slide the shaft 88 rearward and into the slide bearing 92. With the first retainer 84 in engagement with the holder 30 (e.g., the shaft 88 in the slide bearing 92), the holder is inhibited from rotating. The first retainer 84 includes a stop 94 on the shaft 88 configured to engage the slide bearings 90, 92 to limit the forward and rearward movement of the shaft. The first retainer 84 may be biased, such as with a spring (not shown), to engage the holder 30.

Figure 3:
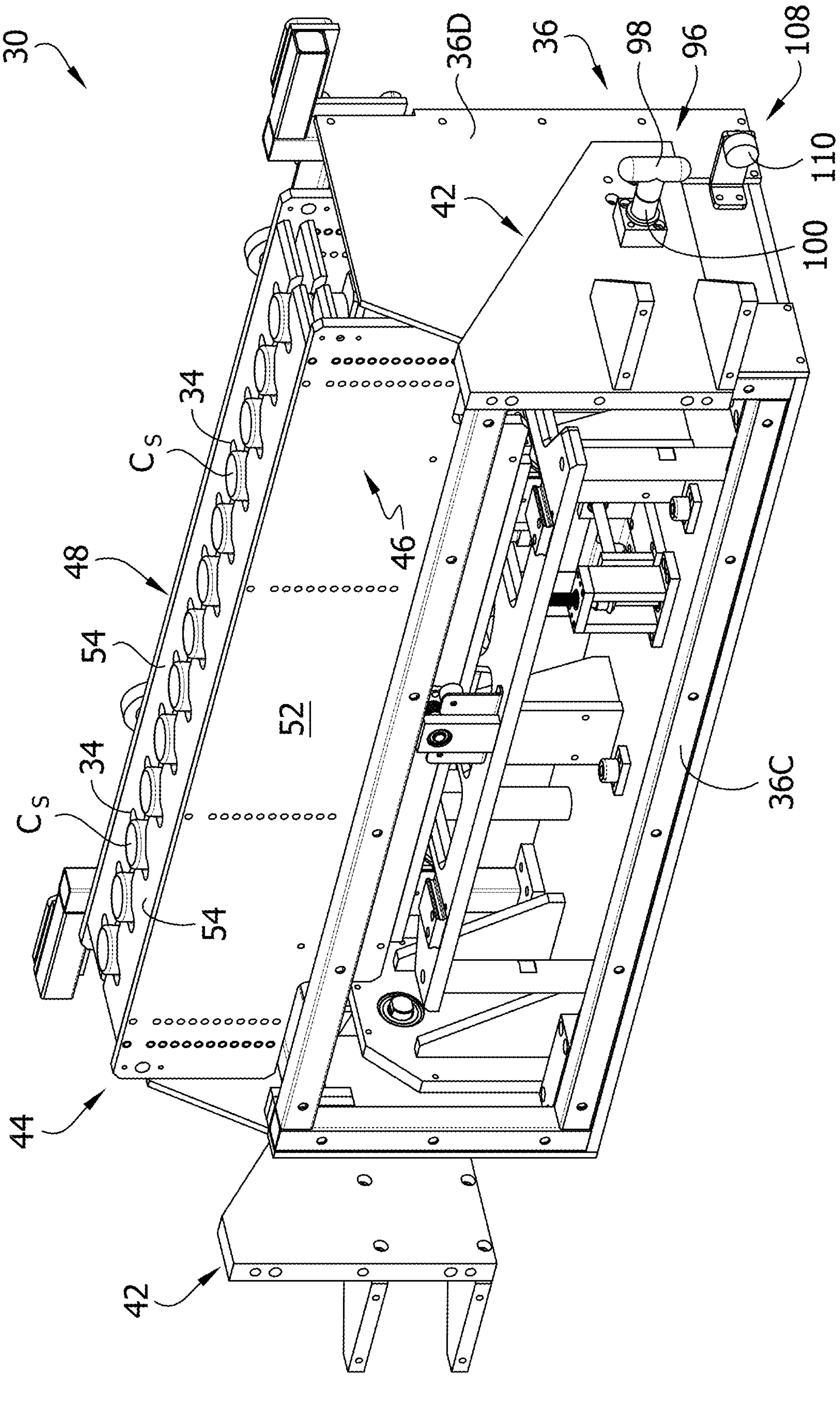
FIG. 3 is a rear perspective of the container holder.
Figure 4:
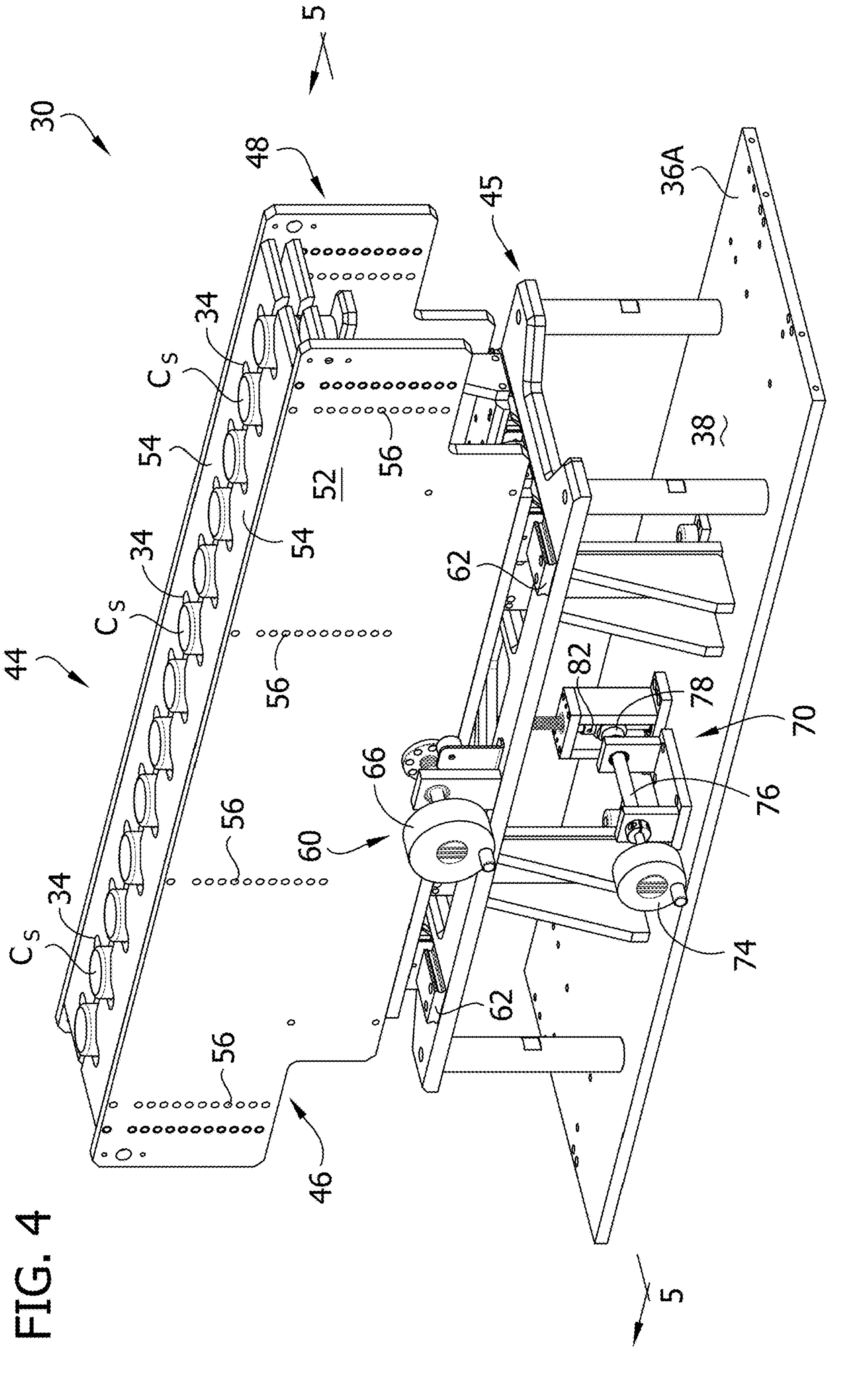
FIG. 4 is a front perspective of the container holder with components thereof hidden from view to reveal interior details.
Figure 10:
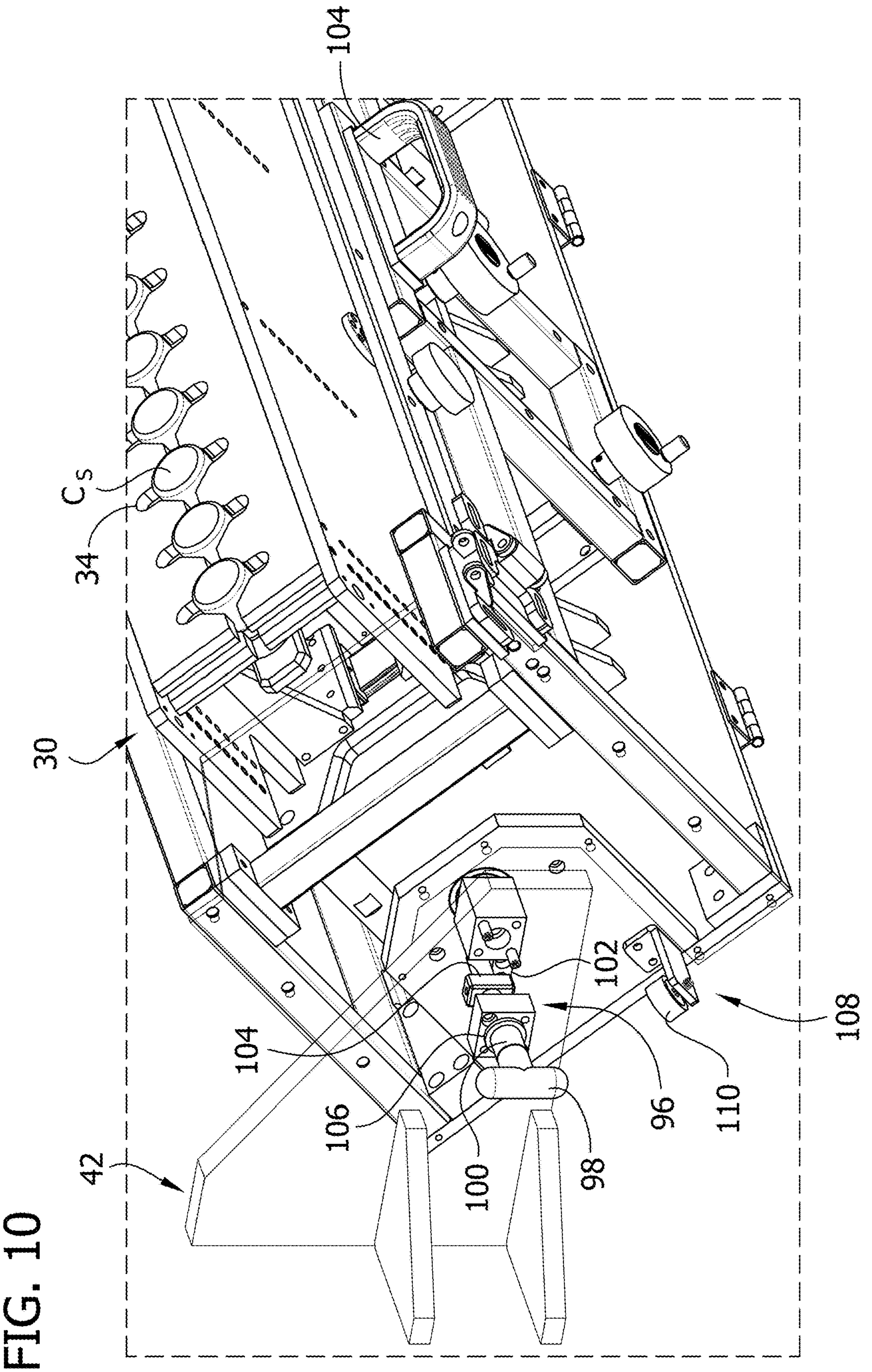
FIG. 10 is an enlarged, fragmentary perspective of the holder showing a second retainer securing the holder in the loading position, a holder support bracket is shown as being transparent to reveal interior details.

As shown in FIGS. 3 and 10, a second retainer 96 is configured to retain the holder 30 in the loading position. The second retainer 96 is configured to engage the holder 30 to secure the holder in the loading position. The second retainer 96 is releasable from the holder 30 (e.g., disengagable) to permit the holder 30 to move from to the loading position to other positions. The second retainer 96 includes a handle or knob 98 coupled to a shaft 100. The shaft 100 is slidably mounted to the left holder support bracket 42. Accordingly, the first retainer 84 is generally on one side (e.g., right side) of the holder 30 and the second retainer 96 is generally on the opposite side (e.g., left side) of the holder to inhibit an operator from reaching both retainers as the same time, for safety reasons. The second retainer 96 includes a stop 102 secured to the side wall 36D of the holder housing 36 and configured (e.g., disposed) to engage the shaft 100 to position the holder 30 in the loading position. To move the holder 30 from the cutting position to the loading position, the operator rotates the holder forward. In one embodiment, the operator may rotate the holder 30 about 45 degrees. The operator may use a handle 104 on the front of the holder 30 to grab and rotate the holder between the different positions. The operator rotates the holder 30 forward until the stop 102 engages the shaft 100, thereby positioning the holder in the loading position. In this position, the weight of the holder 30 urges the holder to rotate forward, thereby keeping the stop 102 engaged with (e.g., biased against) the shaft 100 and retaining the holder in the loading position. In the loading position, the holder 30 is free to move to the cutting position (e.g., free to rotate rearward). To move the holder 30 from the loading position to the cutting position, the operator simply rotates the holder rearward.

The second retainer 96 inhibits the holder 30 from moving (e.g., rotating) towards the setup position. In particular, the engagement between the shaft 100 and stop 102 inhibits the holder 30 from moving towards the setup position. To release the holder 30 from the loading position to move the holder to the setup position, the operator moves the handle 98 outward (e.g., leftward) to slide the shaft 100 outward and out of engagement with the stop 102 (e.g., out of a position where the shaft can be engaged by the stop). With the second retainer 96 disengaged, the holder 30 is free to be rotated to the setup position (e.g., the stop 102 can move past the shaft 100). The operator moves the handle 98 inward (e.g., rightward) to slide the shaft 100 inward and into a position where it can be engaged by the stop 102 to enable the second retainer 96 to position the holder 30 in the loading position. The second retainer 96 includes stops 104, 106 on the shaft 100 configured to engage the holder support bracket 42 to limit the inward and outward movement, respectively, of the shaft.

As shown in FIGS. 2, 3, 8 and 10, a third retainer 108 is configured to retain the holder 30 in the setup position. The third retainer 108 is configured to engage the holder support brackets 42 to secure the holder in the setup position. In the illustrated embodiment, the third retainers 108 comprise stops 110 configured to engage the holder support brackets 42 (e.g., the underside thereof) to position the holder 30 in the setup position. In the illustrated embodiment, the holder 30 includes two third retainers 108, one retainer coupled to one side wall 36D and the other retainer coupled to the other side wall of the holder housing 36. To move the holder 30 to the setup position, the operator rotates the holder forward until the stops 110 engage the holder support brackets 42. In one embodiment, the operator may rotate the holder 30 about 45 degrees from the loading position and about 90 degrees from the cutting position to move the holder to the setup position. In the setup position, the weight of the holder 30 urges the holder to rotate forward, thereby keeping the stops 110 engaged (e.g., biased against) with the holder support brackets 42 and retaining the holder in the setup position. In the loading position, the holder 30 is free to move to the cutting or loading position (e.g., is free to rotate rearward). To move the holder 30 from the setup position, the operator simply rotates the holder rearward.

Figure 12:
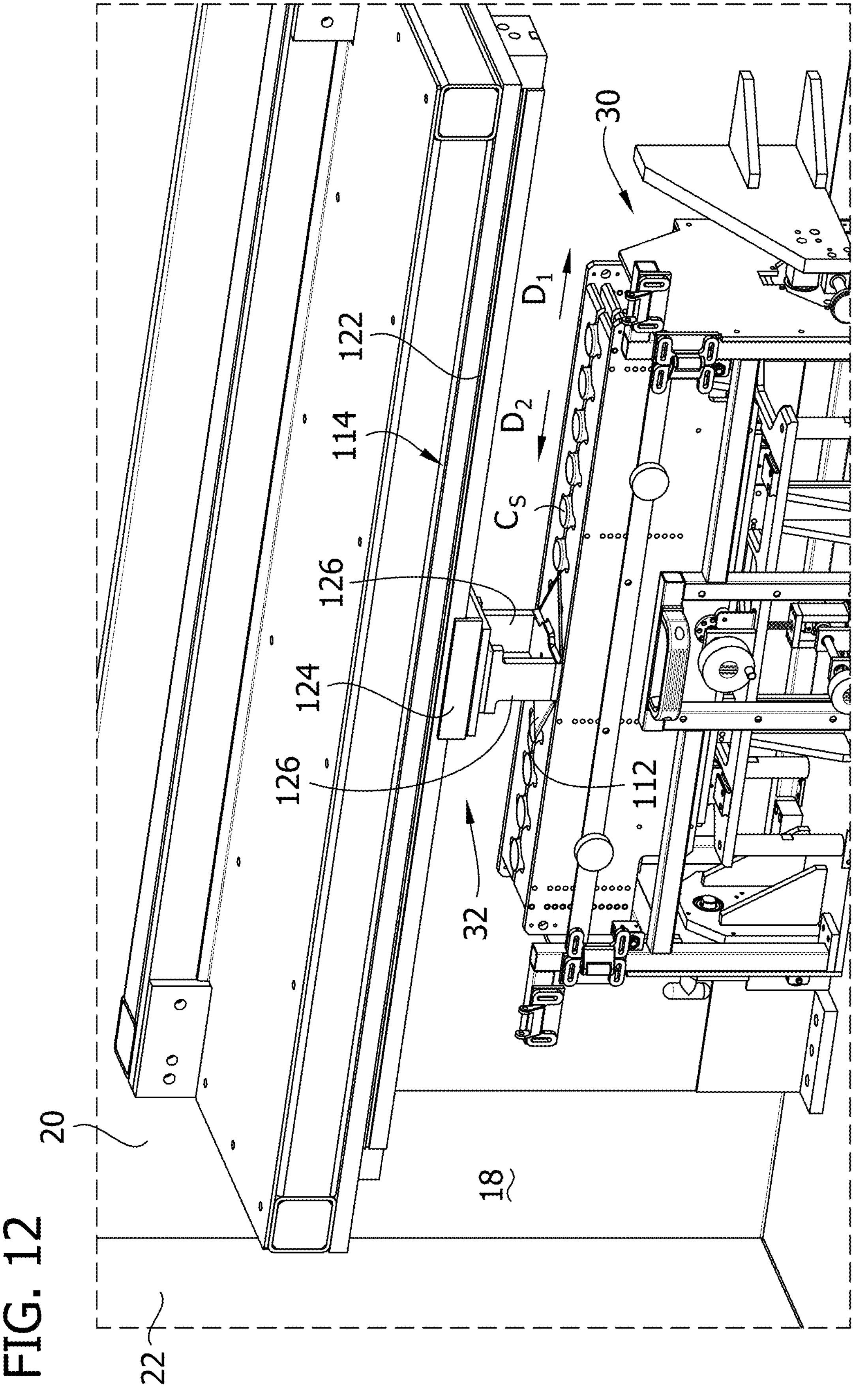
FIG. 12 is an enlarged, fragmentary perspective of the pharmaceutical container processing system with a cutter shroud hidden from view to show the cutter of the system cutting containers.
Figure 13:
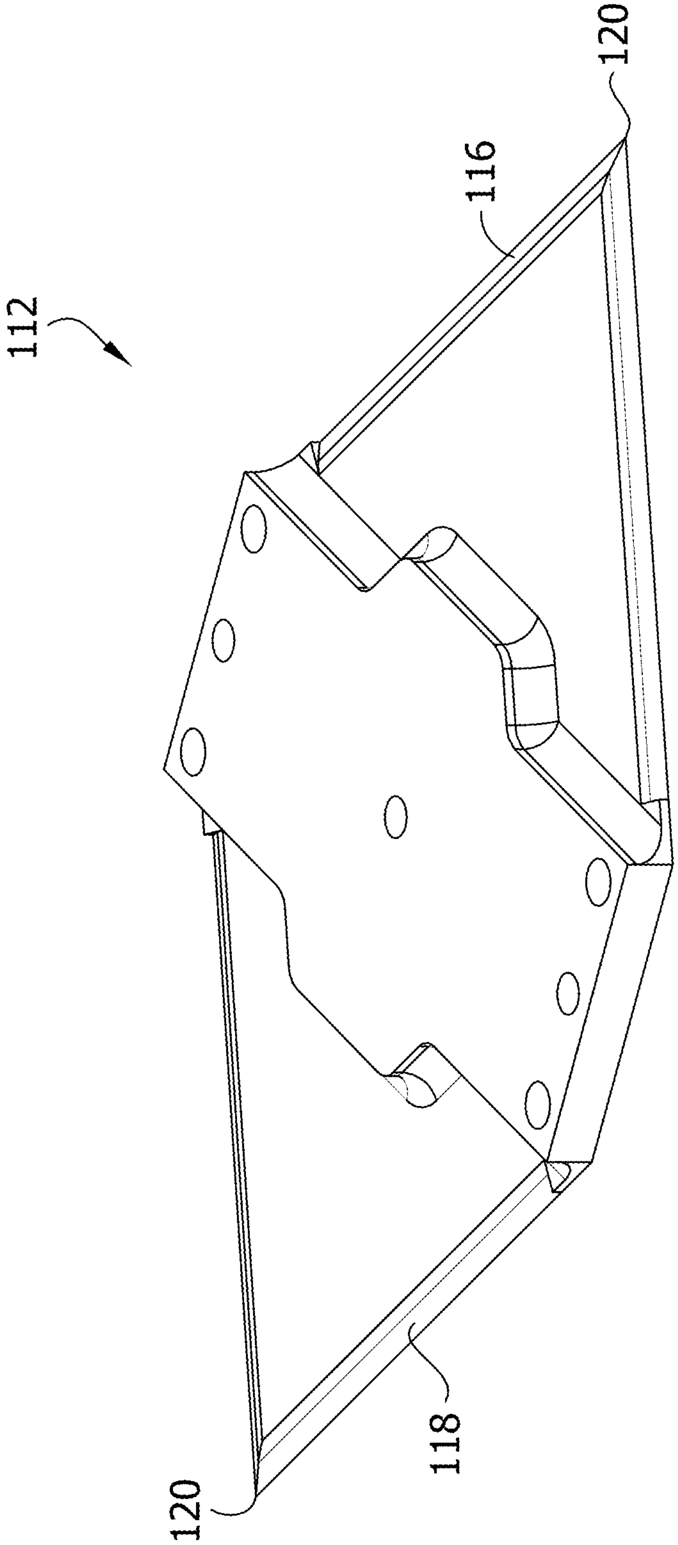
FIG. 13 is a perspective of a blade of the cutter.

Referring to FIGS. 12 and 13, the cutter 32 is configured to cut the plurality of contains $C_S$ held by the holder 30 to create a pharmaceutical opening or outlet in the container. The cutter 32 cuts off the upper portion of the container $C_S$ (relative to how the container is oriented in the container space 34A) to form the pharmaceutical outlet. The cutter 32 may cut off a bottom or a top of the container $C_S$ depending on how the container is loaded into the holder 30, as explained in more detail below. The cutter 32 includes a blade 112 and a prime mover 114 operatively coupled to the blade. The prime mover 114 moves the blade 112 toward and through the containers $C_S$ to cut the containers open. The blade 112 has at least one cutting edge. In the illustrated embodiment, the blade 112 is double sided allowing the blade to cut in multiple directions. The blade 112 includes opposite first and second cutting edges 116, 118. The first and second cutting edges 116, 118 are generally identical (e.g., mirror images of each other). In the illustrated embodiment, the blade 112 has a generally arrow shape (e.g., double arrow shape), with the first and second cutting edges 116, 118 each having a generally V-shape. The first and second cutting edges 116, 118 each have a driving point 120 configured to pierce and cut the containers $C_S$. The blade 112 has a thickness of about 1/16 inch, which is thicker than conventional container cutting blades, such as ultrasonic cutting blades. This can be a maximum thickness with the edges ending in thin, fine dimensions to aid in cutting. The blade can also increase in thickness toward the center line as compared to the outer sides of the blade. The increased thickness makes the blade 112 more durable and able to last longer (e.g., make more cuts) than thinner blades. The blade 112 may also include a central rib or backbone (not shown) on the upper side thereof generally extending from point 120 to point to strengthen the blade and help facilitate the removal of cut material from the blade. As a result of the increased strength of the blade 112, the blade can cut thick (e.g., very thick) containers $C_S$ without breaking or shattering, unlike conventional blades.

The prime mover 114 advances or moves the blade to cut the containers $C_S$ when the holder 30 is in the cutting position. In the illustrated embodiment, the cutter 32 includes a track 122 and a carriage 124 movable along the track. The track 122 is generally linear, although other configurations are within the scope of the present disclosure. The blade 112 is coupled to the carriage 124. In the illustrated embodiment, blade supports 126 support and suspend the blade 112 below the carriage 124. The track 122 defines a blade travel path that the blade 112 moves along as the carriage 124 is moved by the prime mover 144 on the track. The prime mover 114 is configured to move the blade 112 in a cutting stroke along the blade travel path to cut the containers $C_S$. In the exemplary embodiment, the cutter 32 has two cutting strokes: a left-to-right cutting stroke and a right-to-left cutting stroke (e.g., the blade 122 can move in two directions). The prime mover 114 is operatively coupled to the carriage 124 to move the carriage and blade 112 along the track in the cutting stokes. Specifically, the blade 112 moves in either a first direction $D_1$ or a second direction $D_2$ generally opposite the first direction along the blade travel path. FIG. 12 shows the carriage 124 and blade 112 moving in the left-to-right cutting stroke (e.g., the first direction $D_1$). The cutter 32 is configured to cut the containers $C_S$ held by the holder 30 when the blade 112 moves in a cutting stroke (e.g., the first or second direction $D_1$, $D_2$). The prime mover 114 moves the blade 112 along the track 122 in the first direction $D_1$ to cut the containers $C_S$ with the first cutting edge 116 and moves the blade along the track in the second direction $D_2$ to cut the containers with the second cutting edge 118. In other words, the prime mover 114 can move the blade 112 from left to right (e.g., the first direction $D_1$) to cut the containers $C_S$ or can move the blade from right to left (e.g., the second direction $D_2$) to cut the containers. The blade 112 cuts the containers $C_S$ in one (e.g., a single) pass (e.g., advance). Desirably, the prime mover 114 moves the blade 112 in a first or left-to-right cutting stroke (e.g., the first direction $D_1$) to cut a first batch of containers $C_S$ held by the holder 30 and then moves in a second or right-to-left cutting stroke (e.g., the second direction $D_2$) to cut another batch of the containers held by the holder. This way the cutter 32 does not have to reset (e.g., return to the starting position) after every cutting stroke.

The prime mover 114 is configured to move the blade 112 at a steady and relatively slow place, when compared to conventional ultrasonic cutters. Desirably, the prime mover 114 moves the blade 112 at about 0.5 to 5 ft/s, even more desirably about 1 to 3 ft/s and even more desirably about 1 to 2 ft/s. Each of these speeds can be altered by +/−0.1 ft/s, +/−0.25 ft/s, +/−0.3 ft/s, +/−0.5 ft/s, or combinations thereof. The slow and steady speed of the movement of the blade 112 reduces or minimizes the amount of debris or fine particles (e.g., dust) created by cutting the container $C_S$ open with the blade.

The cutter 32 is configured to cut the batch of containers $C_S$ held by the holder 30 with a single pass or advance of the blade 112 by the prime mover 114. The container receivers 34 position the containers $C_S$ to be cut one after another as the blade is advanced along the blade travel path (e.g., in either the first or second directions $D_1$, $D_2$ (broadly, a single linear direction)). The container receivers 34 of the holder 30 are linearly or longitudinally aligned. The track 122 is generally parallel to the row of container receivers 34. The track 122 is aligned (e.g., vertically aligned) with the container spaces 34A when the holder 30 is in the cutting position such that the blade travel path extends through the containers $C_S$. Accordingly, in the cutting position, the container spaces 34A are arranged to position the containers $C_S$ along (e.g., in) the blade travel path to be cut as the blade 112 moves in the cutting stroke along the blade travel path (e.g., the cutter 32 is in registration with the containers). As a result, the blade 112 cuts all the containers $C_S$ held by the holder 30 when the blade moves in a cutting stroke (e.g., in either direction along the track 122). Desirably, the container receivers 34 position the containers $C_S$ to be pierced by the driving point 120 of the blade 112, and more desirably, position the containers such that the driving point pierces generally the middle or center of the containers.

Figure 14:
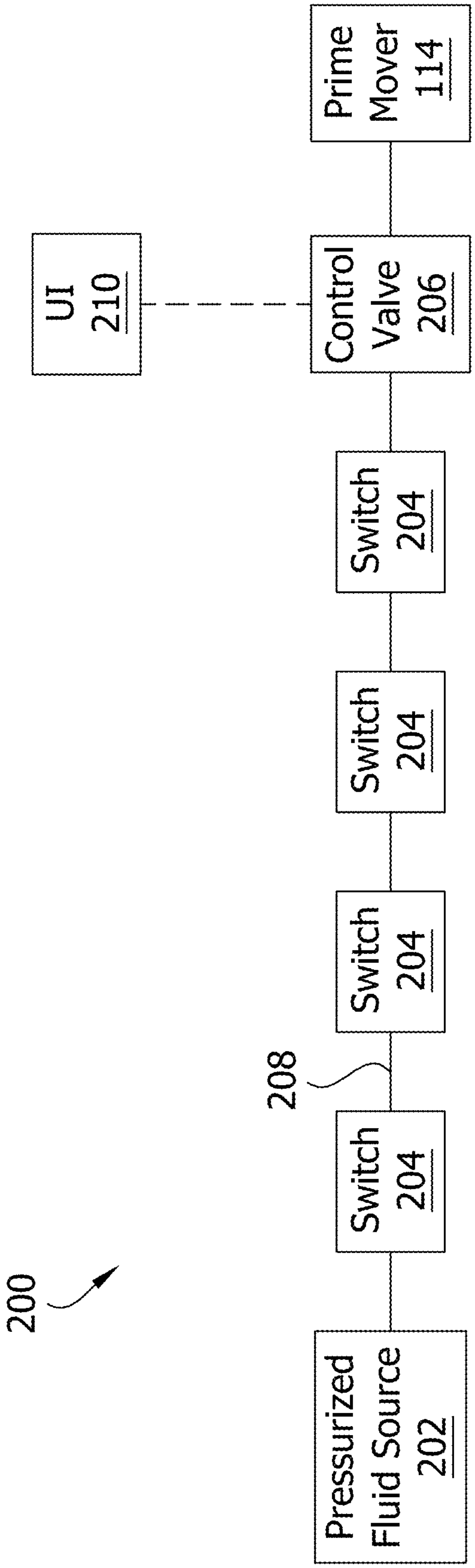
FIG. 14 is a schematic illustration of an exemplary pneumatic system of the pharmaceutical container processing system.

In the illustrated embodiment, the prime mover 114 is a pneumatic actuator, such as a rodless pneumatic cylinder or any other suitable device. The rodless pneumatic cylinder saves space by reducing the size of the cutter 32. Referring to FIG. 14, the pneumatic actuator 114 is part of a pneumatic system, generally indicated at 200, of the system 10 used to control the pneumatic actuator and the movement of the blade 112. The pneumatic system 200 includes a pressurized fluid (e.g., air) source 202, such as a compressor, one or more pneumatic switches 204, a control valve 206, the pneumatic actuator 114 and plumbing or supply lines 208 fluidly coupling these components together. The pneumatic system 200 may also include a user interface 210, such as a lever, switch, button, etc., operatively coupled to the control valve 206 to selectively actuate the control valve to supply pressurized fluid to the pneumatic actuator 114 to move the blade 112 or stop the supply of pressurized fluid to the pneumatic actuator. The switches 204 and control valve 206 are fluidly disposed between the pressurized fluid source 202 and the pneumatic actuator 114. The switches 204 are configured to interrupt (e.g., stop) or permit the supply of fluid to the pneumatic actuator 114. In the illustrated embodiment, the switches 204 are configured to permit the supply of fluid to the pneumatic actuator 114 when the switches are engaged or actuated and to stop the supply of fluid to the pneumatic actuator when the switches are disengaged or not actuated. The switches 204 may be pneumatic roller switches, plunger switches, or any other suitable device. The switches 204 are safety mechanisms configured to permit the pneumatic actuator 114, and thereby the blade 112, to move only when the holder 30 is in the correct configuration (e.g., locked in the cutting position and the door 40 closed). The holder 30 includes a first set of switches 204 (FIG. 8) that are engaged by the first retainer 84 when the first retainer secures and locks the holder in the cutting position. Specifically, the switches 204 are actuated by the shaft 88 when the shaft extends through the slide bearing 92. Accordingly, this first set of switches 204 permits the supply of fluid to the pneumatic actuator 114 only when the holder 30 is locked and secured in the cutting position (not simply when the holder is in the cutting position). If the holder 30 is in another position or is not locked by the first retainer 84 in the cutting position, the first set of switches 204 will inhibit the supply of fluid to the pneumatic actuator 114, preventing the blade 112 from moving. The holder 30 also includes a second set of switches 204 (FIG. 2) that are engaged by the door 40 when the door is closed. Accordingly, this second set of switches 204 permits the supply of fluid to the pneumatic actuator 114 only when the door 40 is closed. If the door 40 is open, the second set of switches 204 will inhibit the supply of fluid to the pneumatic actuator 113, preventing the blade 112 from moving. Other configurations and arrangements of the switches 204 are within the scope of the present disclosure.

Referring to FIG. 1, the housing 12 includes a cutter shroud 130 generally surrounding the cutter 32. The cutter shroud 130 generally inhibits the operator from coming into contact with the blade 112 (such as when the blade is moving). The cutter shroud 130 also helps contain any cutting debris.

It will be appreciated that other configurations of the system 10 are within the scope of the present disclosure. For example, in one contemplated embodiment, the cutter is movable between different positions (e.g., a cutting position, a retracted position) and the container holder is stationary. In this embodiment, the cutter may move between a cutting position and a loading position. In the cutting position, the cutter is in registration with the batch of containers $C_S$ held by holder. The cutter is arranged to cut the containers $C_S$ held in the container receivers (e.g., arranged to position the blade 112 to cut the container). In the loading position, the cutter is arranged to permit the holder to receive the containers $C_S$. The cutter is spaced apart from the holder (relative to the position of the cutter in the cutting position) and therefore does not block or otherwise impede access to the holder. This allows the operator to insert the containers $C_S$ into the holder and/or remove the containers from the holder. In other words, in the loading position the plurality of container receivers are accessible to receive the containers $C_S$. In another contemplated embodiment, both the holder 30 and the cutter 32 may both be movable. Accordingly, it is contemplated that, broadly, at least one of the holder 30 or the cutter 32 can be movable to arrange the containers $C_S$ held by the holder in registration with the cutter.

The pharmaceutical container processing system 10 is particularly suited for removing pharmaceuticals from small batches (e.g. 10 or less) and medium batches (10-50) of small containers $C_S$. For small quantities of containers $C_S$, an operator can open the containers manually and dump the pharmaceuticals out on the pharmaceutical collector 24. The operator can then move the pharmaceuticals into the bulk container $C_B$. For small quantities of containers $C_S$, it may be more efficient to open the containers manually instead of using the holder 30 and cutter 32, which may require setting up or configuring the holder for the particular size and shape of containers. However, in other methods of operation, the operator can use the holder 30 and cutter 32 to open the containers $C_S$ for small quantities. For medium quantities of containers $C_S$, the operator can use the holder 30 and cutter 32 to open the containers and then dump the pharmaceuticals out on the pharmaceutical collector 24. For medium quantities, it may be more efficient to spend the time to configure the holder 30 for the particular size and shape of the containers and then use the holder and cutter 32 to open the containers. It is understood the system 10 may also be used for large quantities (50+) of containers $C_S$.

In one exemplary method of operation of the pharmaceutical container processing system 10, an operator uses the holder 30 and cutter 32 to open a batch of containers $C_S$. Depending on the existing configuration of the holder 30, the operator may have to adjust the configuration of the holder to fit the size and shape of the containers $C_S$ to be opened. The operator can use the first adjustor 60 to change the width of the container receiving spaces 34A of the receivers 34 to fit the width of the containers $C_S$. The operator rotates the handle 66 either clockwise or counter-clockwise to increase or decrease the width of the container spaces 34A. The operator can also use the second adjustor 70 to change the height of the container spaces 34A to fit the height of the containers $C_S$. The operator rotates the handle 74 either clockwise or counter-clockwise to increase or decrease the height of the container spaces 34A. The height of the container spaces 34A is set to be smaller than the height of the containers $C_S$ so that a portion of the containers is disposed above the supporter 44 and in the path of the blade 112 to be cut thereby. In addition, the operator can change out the racks 54 (e.g., with racks having other numbers, sizes, and/or shapes of teeth) to fit the size and shape of the containers $C_S$. The operator opens the door 40 to access and switch out the racks 54 of the first jaw 46 when the holder 30 in the cutting position. The operator can then move the holder 30 to the setup position to access and switch out the racks 54 of the second jaw 48. The process of moving the holder 30 to the different positions, such as the setup position, is described in more detail above. The operator adjusts the configuration of the holder 30 to modify the size and shape of the container receiving spaces 34A to the containers $C_S$. Desirably, the operator makes the container receiving spaces 34A slightly larger than the containers $C_S$ so that a small amount of clearance exists to easily move the containers into and out of the container spaces. The holder 30 does not form a snug or friction tight fit with the containers $C_S$. Even with this small amount of clearance, the holder is still able to retain the containers as the containers are cut by the cutter 32. However, it will be appreciated that a snug, friction, or even clamping fit can be used.

Once the holder 30 is set up to for the containers $C_S$, the operator moves the holder to the loading position. The operator then loads the containers $C_S$ into the holder 30. The operator places (e.g., drops) each container $C_S$ into a container space 34A. The operator can place each container $C_S$ upside down so that the bottom of the container is facing up to be cut off, or the operator can place each container right-side up so that the top (e.g., lid) of the container is facing up to be cut off After all of the containers $C_S$ are loaded or the holder 30 is full, the operator moves the holder to the cutting position to position the containers to be cut. Broadly, the operator moves at least one of the holder 30 or the cutter 32 to arrange the cutter in registration with the containers $C_S$ to be cut. As explained above, in the illustrated embodiment the holder 30 is moveable and the cutter 32 is stationary. However, in other embodiments the cutter may be moveable and the holder stationary. After the containers $C_S$ are arranged along the blade travel path, the operator uses the cutter 32 to cut the containers open. The cutter 32 cuts the containers $C_S$ to form the pharmaceutical outlet in each container. The operator uses the user interface 210 to activate the prime mover 114 to move the blade 112. As the blade 112 moves in either the first or second directions $D_1$, $D_2$, the containers $C_S$ are cut one after another. All the containers $C_S$ held by the holder 30 are cut by the blade 112. The blade 112 stops moving once it reaches the end of the track 122. As the cutter 32 cuts the containers $C_S$, any cutoffs or debris generally fall into the interior 38 of the holder 30 or down onto the work surface 16. The cutoffs and debris is collected by the operator and thrown away. The operator opens the door 40 to remove any cutoffs, debris and/or pharmaceuticals that may have fallen into the interior 38 of the holder 30. It will be appreciated that the holder can be configured to hold multiple rows (e.g., two rows) of containers, and the rows of containers could be cut in a similar fashion (one container after another in each row) as the cutter travels through the rows at the same time.

To remove the pharmaceuticals from the containers $C_S$, the operator moves the holder 30 back to the loading position. The operator then removes the containers $C_S$ from the holder 30. The operator picks up or pulls the containers $C_S$ from their respective container spaces 34A. In this manner, the loading position may also be considered an unloading position (e.g., a loading and unloading position). After the operator removes the containers $C_S$ from the holder 30, the operator moves the pharmaceuticals out of the containers through the pharmaceutical outlets. The operator may dump the pharmaceuticals out of the containers $C_S$ through the pharmaceutical outlets and onto the pharmaceutical collector 24, e.g., by rotating the holder 180 degrees into an inverted dumping position. The inverted position has the cut open end of the containers rotated over 90 degrees, e.g., to 180 degrees, to allow the contents to freely fall from the containers $C_S$ through the cut end thereof under the force of gravity. The operator can then sift through the pharmaceuticals on the collector 24, remove any debris or packaging and move the pharmaceuticals into the bulk container $C_B$. The operator then loads another group of the containers $C_S$ into the holder 30 and the process repeats. The operator continues until all the pharmaceuticals have been removed from the batch of containers $C_S$. In an alternative embodiment, the user may move the holder to a dumping position (e.g., the setup position or beyond) in which the pharmaceuticals are dumped from the containers generally simultaneously (in which case a friction fit or clamping of the container in the holder may be desirable), and then the user may remove the empty containers from the holder. In an example, embodiment, a mechanical arm with a gripper can grip the containers $C_S$, move the container to a dump position and dump the contents of the containers $C_S$ for dumping the contents for transfer to the bulk container $C_B$.

In one embodiment, the operator may move the holder 30 to a dump position (not shown) to dump all the pharmaceuticals out of the containers $C_S$ and onto the pharmaceutical collector 24 at generally the same time. In the dump position, the holder 30 is rotated about 180 degrees (e.g., flipped over) from the cutting position. In this position, the openings in the containers $C_S$ held by the holder 30 generally face downward, permitting the pharmaceuticals to flow out of the containers. In this embodiment, the holder 30 (e.g., supporter 44) may be configured to grip each containers $C_S$ to prevent the containers from falling out of the holder when the holder is in the dump position. Likewise, the third retainers 108 may be reconfigured to permit the holder to rotate past the setup position to the dump position.

As is apparent, the operator moves the holder 30 between the different positions during operation of the system 10. To move the holder 30 from the cutting position, the operator releases or disengages the first retainer 84. The operator moves (e.g., pulls) the handle 86 forward until the shaft 88 is free of the slide bearing 92. The holder 30 is now free to rotate. The operator may grab the handle 104 to rotate the holder 30. The operator may rotate the holder 30 in a forward direction to either the loading or setup positions. To position the holder 30 in the cutting position, the operator moves the holder in a rearward direction (from the loading or setup position) until the slide bearing 92 on the holder is aligned with the shaft 88 of the first retainer 84. In the illustrated embodiment, the system includes latches 41 (FIG. 1), such as ball and detent latches, configured to position the holder so that the slide bearing 92 is aligned with the shaft 88 (e.g., in the cutting position). One part of the latch 41 is on the holder 30 and the other part of the latch is on the cutter shroud 130, with the two parts engaging one another when the holder 30 is in the cutting position. The latches 41 may also help hold the holder 30 in the cutting position until the first retainer 84 is engaged and locks the holder in the cutting position. Once in position, the operator engages the first retainer 84. The operator moves (e.g., pushes) the handle 86 rearward, sliding the shaft 88 into the slide bearing 92 and into engagement with the switches 204, thereby locking the holder 30 in the cutting position.

To move the holder 30 to the loading position, the operator rotates the holder until the second retainer 96 is engaged. The operator confirms the shaft 100 of the second retainer 96 is positioned to be engaged by the stop 102 or move the shaft inward via the handle 98 as needed. The operator rotates the holder 30 until the stop 102 engages the shaft 100, thereby positioning the holder in the loading position. To move the holder 30 to the cutting position from the loading position, the operator simply rotates the holder 30 in a rearward direction toward the cutting position. To move the holder 30 to the setup position from the loading position, the operator first disengages the second retainer 96. The operator moves the handle 98 outward until the shaft 100 is no longer positioned to be engaged by the stop 102. This enables the stop 102 to move past the shaft 100, allowing the holder 30 to rotate forward to the setup position. To move the holder 30 to the setup position, the operator rotates the holder forward until the third retainers 108 engage the holder support brackets 42. To move the holder 30 from the setup position, the operator simply rotates the holder in a rearward direction toward the loading and cutting positions.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A pharmaceutical container processing system for removing pharmaceuticals from a batch of containers, the system comprising:

a cutter having a blade configured to cut open the batch of containers, the cutter configured to move the blade along a blade axis to cut open the batch of containers, the blade axis intersecting the blade; and a holder having a first container receiver defining a first container receiving space sized and shaped to hold a first container of the batch of containers, a second container receiver defining a second container receiving space sized and shaped to hold a second container of the batch of containers, and a third container receiver defining a third container receiving space sized and shaped to hold a third container of the batch of containers, the first, second, and third container receivers being arranged in a single file row;

at least one of the holder or the cutter being movable between a loading position and a cutting position, wherein in the loading position:

the first, second, and third container receiving spaces are accessible to receive the respective first, second, and third containers, and wherein in the cutting position:

the cutter and the first, second, and third container receiving spaces are arranged relative to one another such that the blade axis of the cutter intersects the first, second, and third containers when the first, second, and third containers are received by the respective first, second, and third container receiving spaces to cut the first, second, and third containers, the single file row of the first, second, and third container receivers is arranged parallel to the blade axis, and the cutter is disposed above the first, second, and third container receivers; and wherein the cutter is configured to cut the first, second, and third containers one after another as the blade is advanced along the blade axis in a single cutting stroke when said at least one of the holder or the cutter is in the cutting position.

2. The system of claim 1, wherein the holder is movable between the loading position and the cutting position.

3. The system of claim 2, further comprising at least one retainer configured to retain the holder in the cutting and loading positions.

4. The system of claim 3, wherein the at least one retainer includes a first retainer to retain the holder in the cutting position and a second retainer to retain the holder in the loading position.

5. The system of claim 2, wherein the holder pivots about a horizontal axis between the loading position and the cutting position.

6. The system of claim 5, wherein the holder pivots about the horizontal axis in a first direction from the cutting position toward the loading position, and wherein the holder pivots about the horizontal axis in a second direction from the loading position toward the cutting position, the second direction being opposite the first direction.

7. The system of claim 2, wherein an imaginary axis intersects the first, second, and third container receiving spaces and is parallel to the blade axis when the holder is in the cutting position, and wherein the imaginary axis is disposed at a first location when the holder is in the cutting position and a second location spaced apart from the first location when the holder is in the loading position.

8. The system of claim 1, wherein the holder is adjustable to adjust at least one of a size or shape of the first, second, and third container receiving spaces.

9. The system of claim 8, wherein the holder includes opposite first and second jaws bounding the first, second, and third container receiving spaces.

10. The system of claim 9, wherein the first jaw is movable to adjust a width of the first, second, and third container receiving spaces.

11. The system of claim 10, wherein the holder includes a container rest bounding bottoms of the first, second, and third container receiving spaces.

12. The system of claim 11, wherein the container rest is movable to adjust a height of the first, second, and third container receiving spaces.

13. The system of claim 1, wherein the cutter includes a prime mover operatively coupled to the blade to advance the blade along the blade axis to cut the first, second, and third containers when said at least one of the holder or the cutter is in the cutting position.

14. The system of claim 1, wherein the cutter includes:

a track;

a carriage movable along the track, the blade coupled to the carriage, the blade having opposite first and second cutting edges; and a prime mover operatively coupled to the carriage to move the carriage and blade along the track in a first direction to cut with the first cutting edge and to move the carriage and blade along the track in a second direction to cut with the second cutting edge.

15. The system of claim 14, wherein the first and second cutting edges are V-shaped.

16. The system of claim 15, wherein the prime mover comprises a pneumatic actuator.

17. The system of claim 14, wherein the second direction is opposite the first direction.

18. The system of claim 1, wherein the blade is arranged relative to the first, second, and third container receiving spaces to cut the first, second, and third containers held by the holder in a single stroke when said at least one of holder or the cutter is in the cutting position.

19. The system of claim 1, wherein in the loading position the cutter and the first, second, and third container receiving spaces are arranged relative to one another such that the blade axis of the cutter does not intersect the first, second, and third containers when the first, second, and third containers are received in the respective first, second, and third container receiving spaces.

20. The system of claim 1, wherein the cutter is disposed above the holder when said at least one of the holder or the cutter is in the cutting position.

21. A pharmaceutical container processing system for removing pharmaceuticals from a batch of containers, the system comprising:

a cutter having a blade configured to cut open the batch of containers, the cutter including a prime mover operatively coupled to the blade to advance the blade along a blade axis to cut open the batch of containers, the blade axis intersecting the blade; and a holder having a first container receiver defining a first container receiving space sized and shaped to hold a first container of the batch of containers, a second container receiver defining a second container receiving space sized and shaped to hold a second container of the batch of containers, and a third container receiver defining a third container receiving space sized and shaped to hold a third container of the batch of containers, the first, second, and third container receivers being arranged in a single file row;

at least one of the holder or the cutter being movable between a loading position and a cutting position, wherein in the loading position:

the first, second, and third container receiving spaces are accessible to receive the respective first, second, and third containers, and wherein in the cutting position:

the cutter and the first, second, and third container receiving spaces are arranged relative to one another such that the blade axis of the cutter intersects the first, second, and third containers when the first, second, and third containers are received by the respective first, second, and third container receiving spaces to cut the first, second, and third containers, the cutter is disposed above the first, second, and third container receiving spaces; and the single file row of the first, second, and third container receiving spaces is arranged parallel to the blade axis to position the first, second, and third containers to be cut one after another as the blade is advanced along the blade axis in a single cutting stroke.

22. The system of claim 21, wherein the holder is movable between the loading position and the cutting position.

23. The system of claim 22, wherein each of the first, second, and third container receiving spaces includes an open top, wherein the open tops of the first, second, and third container receiving spaces face in a first direction when the holder is in the loading position, the first direction extending upward and disposed at an angle to the vertical.

24. The system of claim 23, wherein the angle is about 45 degrees.

25. The system of claim 23, wherein the blade axis lies in a vertical plane, the open tops of the first, second, and third container receiving spaces being offset horizontally from the vertical plane when the holder is in the loading position.

26. The system of claim 25, further comprising a retainer arranged to retain the holder in the loading position.

27. The system of claim 21, wherein the blade has opposite first and second ends spaced apart along the blade axis, the blade having a first cutting edge forming the first end and a second cutting edge forming the second end, the blade axis intersecting the first and second cutting edges.

* * * * *